Figure 1:
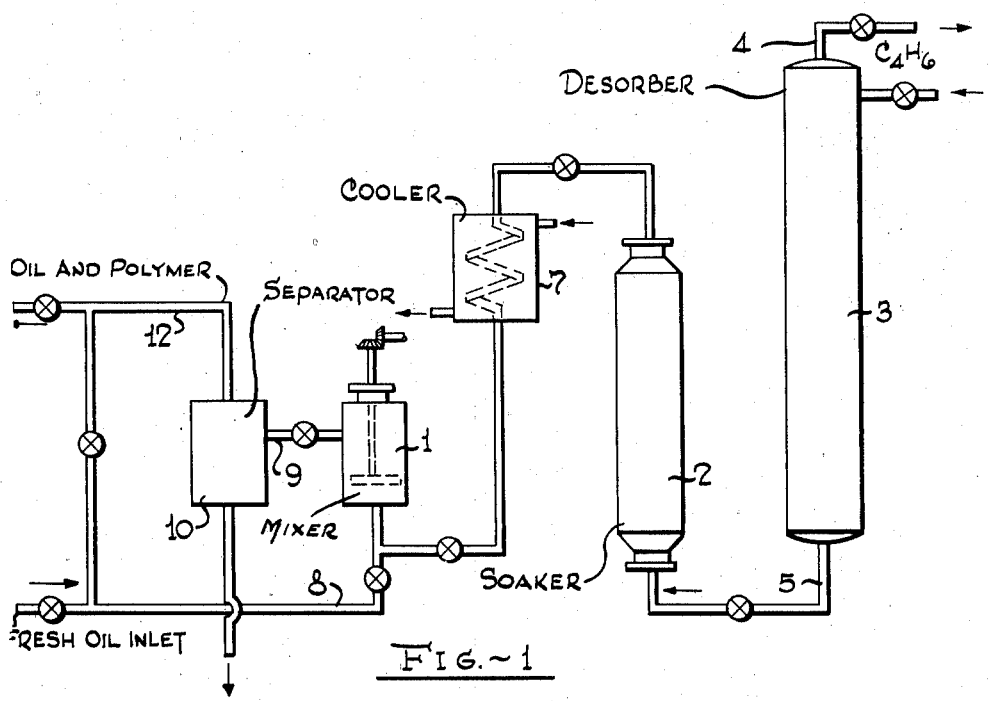

Aug. 28, 1951 C. E. MORRELL ET AL 2,566,137
REMOVING ACETYLENES FROM HYDROCARBON MIXTURES
AND IMPROVEMENTS, IN THE SEPARATION
OF BUTADIENE AND ACETYLENES
Filed March 15, 1950 3 Sheets-Sheet 1

Charles E. Morrell
Miller W. Swaney    Inventors
By Henry Berk   Attorney

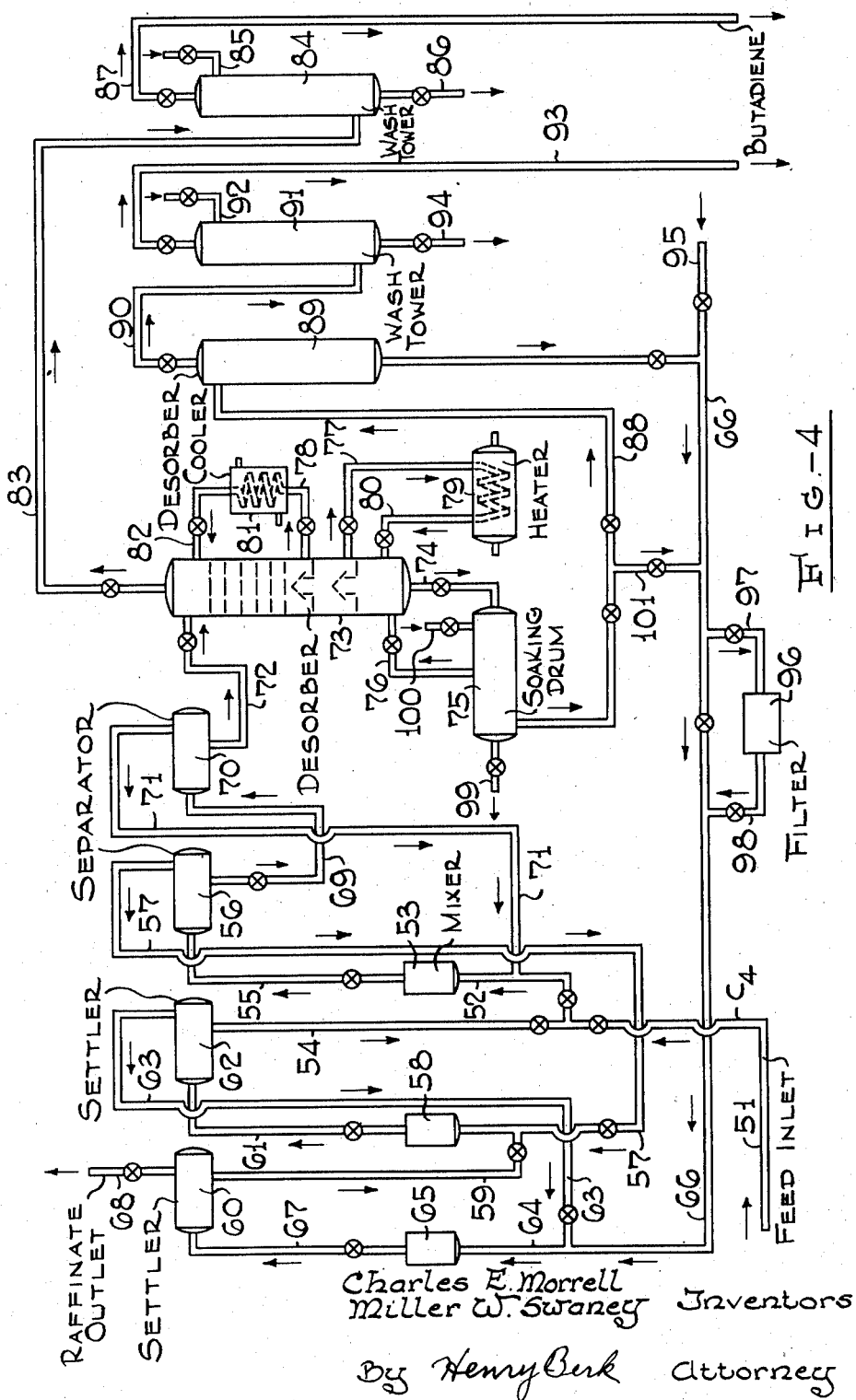

Patented Aug. 28, 1951

2,566,137

UNITED STATES PATENT OFFICE 2,566,137

REMOVING ACETYLENES FROM HYDROCARBON MIXTURES AND IMPROVEMENTS IN THE SEPARATION OF BUTADIENE AND ACETYLENES

Charles E. Morrell and Miller W. Swaney, Westfield, N. J., assignors to Standard Oil Development Company, a corporation of Delaware Application March 15, 1950, Serial No. 149,724

2 Claims. (Cl. 260—681.5)

This invention relates to improvements in the process for separating diolefins from hydrocarbon mixtures containing diolefins and acetylenes and relates particularly to the separation of acetylenes in the process for the separation and segregation of high purity diolefins from the same hydrocarbon mixture.

The present application is a continuation-in-part of applications Serial Number 453,544 filed August 4, 1942 and Serial Number 509,168 filed November 6, 1943 by Charles E. Morrell and Miller W. Swaney, both of these being copending with the present application. Serial No. 509,168 was later converted to a sole application of Charles E. Morrell.

Subject matter of Serial Number 453,544, with which the present application is concerned relates to steps used for polymerizing the various kinds of acetylenes to liquid or oily polymers, which are soluble in solvents that will be described, and to solid polymers that are easily filterable but not similarly soluble, so that the various acetylenes present in an extract solution of butadiene or a diolefin are prevented from contaminating the diolefin as it desorbed, the polymers then being separated as filterable solids or by stratification or phase separation from the lean extract solution, as here-in-after described.

The chief source of diolefins is in hydrocarbon mixtures obtained by cracking petroleum oils. The cracked mixture is first fractionated by distilling the cracked hydrocarbons to obtain a cut containing only hydrocarbons having the same number of carbon atoms to the molecule, for example 4, 5 or 6. All such fractions for example having 4 carbon atoms to the molecule contain both the desirable diolefin butadiene and small traces of alkyl acetylenes in concentrations ranging up to several thousand parts per million. For example, mixtures of $C_4$ hydrocarbons obtained by pyrolyzing petroleum oils, by analysis, were found to contain from 500 to 800 parts per million of mixed ethyl- and vinyl-acetylene. This process will be described with reference to $C_4$ hydrocarbons but may also be used for $C_5$ or $C_6$ hydrocarbons.

In the extraction of butadiene from a hydrocarbon mixture composed of hydrocarbons having 4 carbon atoms to the molecule and also containing acetylenes and diolefins, the alkyl acetylenes are usually concentrated along with the butadiene. Consequently the high purity butadiene produced may be contaminated with fairly large amounts of these acetylenes which are undesirable for the purposes for which the butadiene has been segregated.

An object of this invention is to provide means for the separation or riddance of the acetylenes that generally separate with the butadiene on the extraction of the butadiene from the hydrocarbon mixture.

According to this invention it has been found that both ethyl acetylene and vinyl acetylene possess strong tendencies to polymerize to higher molecular weight substances in contact with heated basic cuprous salt solutions such as ammoniacal cuprous acetate and pyridine cuprous sulfate solutions. For example, when pure ethyl acetylene is heated with an ammoniacal cuprous acetate solution in which it is quite soluble, it is quickly converted to higher boiling oily polymers. Under similar circumstances it was found that vinyl acetylene was converted to a solid insoluble powdery polymer. Both of these polymers are non-explosive and therefore are easily removed from $C_4$ mixtures thus treated.

When a cracked $C_4$ cut containing 25% butadiene, 800 parts per million of mixed acetylenes, and the remainder essentially butenes, is extracted (batch or continuously) at a temperature of about 0° C. with an ammoniacal cuprous acetate solution containing about 3 moles per liter of copper, 4 to 5 moles of acetate and 10 to 11 moles of total ammonia, the butadiene is removed practically quantitatively from this $C_4$ mixture, leaving essentially butenes. In addition, the acetylenes are also removed quantitatively from the $C_4$ hydrocarbon mixture and enter the copper solution as soluble copper acetylides. Now, if this solution is immediately heated to about 70° C. the desorbed butadiene gas which is flashed off will carry a large part of the total acetylenes with it and this may reach a concentration of several thousand parts per million (on butadiene basis). On the other hand, when this solution is heated at this higher temperature without being desorbed (e. g., under pressure) the acetylenes are found to be readily transformed into harmless higher molecular weight polymers.

This principle is used in freeing butadiene and other hydrocarbons of acetylenes. Specifically in the extraction of butadiene from cracked $C_4$ cuts using basic cuprous salt solutions as selective solvents, the extraction or concentration operation is performed in such a manner that the cold copper salt solution is passed countercurrently to the $C_4$ hydrocarbon so as to remove substantially all of the butadiene, accompanied by complete transfer of acetylenes from the $C_4$ phase to the copper solvent. This rich solvent (containing butadiene and acetylenes) is then heated and desorbed countercurrently (at about 70° C.) in a packed or other type of tower while maintaining a considerable amount of "reflux" on the desorption tower. This reflux consists of maintaining the downflowing copper solution at a low temperature in the top of the desorber and supplying heat to the lower regions of the desorber tower. The purpose served by "reflux desorption" is as follows:

When a rich copper solution containing both absorbed butadiene and acetylenes is heated and desorbed, for example by flashing, the butadiene escapes carrying with it considerable quantities of acetylenes, although some of the latter are polymerized by the hot copper solution to high molecular weight substances. However, when a cold rich solution is fed into the top of a countercurrently operated desorber tower to which heat is supplied by means of a 70° C. bottom reboiler, any acetylenes which are not polymerized immediately in the lower hot regions are desorbed and carried upward in fairly high concentrations with the desorbed butadiene which must then pass through the cold solution ("reflux") in the top of the desorber. In this way the acetylenes are reabsorbed and again carried back down to the heated regions of the desorber tower where they are largely polymerized. Those acetylenes which do not polymerize or stay in the hot copper solution are again carried up to the tower with the desorbed butadiene, only to be reabsorbed by the cold reflux and eventually completely polymerized by the hot solution. In this way it is possible to produce high purity butadiene substantially free of acetylenes (ethyl and vinyl), practically irrespective of the concentration of acetylenes in the butadiene-containing $C_4$ cut extracted.

By this means of dissipating or destroying acetylenes by hot copper solutions, butadiene-containing cracked $C_4$ cuts of practically any acetylene content can be continuously extracted without encountering precipitation of explosive copper acetylides.

A further application of the dissipation of acetylenes by polymerization by hot copper solutions consists of taking the hot lean solution leaving the desorber tower and sending it to a soaking drum where it can be kept hot for practically any desired length of time in order to effect additional polymerization of acetylenes before this lean solution is cooled and returned (recycled) to the absorber for further extraction of cracked $C_4$ feed.

A cracked $C_4$ cut of the following approximate composition has been extracted continuously with an ammoniacal cuprous acetate solution of the following approximate composition:

| Cracked $C_4$ Cut | Copper Solvent |
|---|---|
| 25 mol per cent butadiene | 3 moles per liter of cuprous. |
| 17 mol per cent butenes-2 | 0.1 mole per liter of cupric. |
| 35 mol per cent butene-1 | 4 moles per liter of acetate. |
| 20 mol per cent iso-butene | 11 moles per liter of total ammonia. |
| 800–1000 P. P. M. acetylenes | |
| Traces of $C_3$ and $C_5$ | |

By proper control of desorber cold reflux butadiene products of 99.5+% purity were produced containing as little as 300–400 parts per million or less of acetylenes, or less than ten per cent of the acetylenes entering the copper solvent, $$\frac{300 \times 0.25}{1000} = 0.075$$

at least 90% or more being polymerized to high molecular weight polymers during the extraction step. This great reduction in acetylenes was accomplished by sending less than 20% of the cold solution to the top of the desorber as "reflux," the remainder being preheated to desorption temperature and injected into the middle of the desorber tower. Obviously by employing higher "reflux," the acetylene concentration in the butadiene product can be reduced substantially to zero.

EXAMPLE 1

To a 50 cc. quantity of an ammoniacal cuprous acetate solution containing 3 moles per liter of cuprous complex was added several grams of pure vinyl-acetylene. The mixture was heated (enclosed) at 70° C. for a short time, during which all the vinyl-acetylene was converted to a solid powdery material insoluble in all solvents and common acids, being dissolved only by hot sulfuric-chromic acid mixture. This solid polymer is easily filterable from the solution.

EXAMPLE 2

When pure ethyl-acetylene was heated as in Example 1, it was likewise quantitatively polymerized, but to a heavy oily liquid with an ethereal odor, soluble in most solvents.

EXAMPLE 3

During a period of several weeks a mixture of $C_4$ hydrocarbons obtained by cracking of petroleum oils and containing 800–1000 parts per million of acetylenes was extracted continuously with a batch of ammoniacal cuprous acetate solution (containing 3 moles per liter of cuprous complex) which was circulated through several thousand complete cycles in an extraction apparatus consisting of a cold absorber tower and a heated desorber tower, and cold solution reflux was maintained on top of this countercurrent desorber tower. The high-purity butadiene produced contained only about 10 per cent of the alkyl acetylenes entering the copper solution from the $C_4$ cut extracted, and the quantity of acetylenes remaining in the copper solution after desorption was negligible. The remainder (approximately 90%) were polymerized to the harmless polymers described in Examples 1 and 2.

Coincidental with the polymerization of acetylenes in hot copper solutions preferentially to butadiene, one can also advantageously effect the polymerization of allenes, $R-CH=C=CH_2$, selectively over butadiene. Cracked $C_4$ cuts usually contain, in addition to traces of alkyl acetylenes, allenes as well, for example, propadiene, this material boiling higher ($-34°$ C.) than the usual $C_3$ distillation range and therefore being difficult to separate from the $C_4$ cut by distillation. Although propadiene occurs in cracked $C_4$ cuts only in low concentrations, it is a diolefin and is therefore concentrated by copper salt extraction along with butadiene. In order, therefore, to prevent this allene from appearing in appreciable concentrations in the desorbed butadiene product, we have found that it polymerizes quite readily in copper solutions when heated, thus:

EXAMPLE 4

Into a glass tube were placed 10 cc. of ammoniacal cuprous acetate solution (containing 3 moles per liter of cuprous complex) and several grams of pure propadiene. After sealing this tube it was heated to 70° C. for several hours and reopened after cooling to room temperature. Thus the propadiene was found to have polymerized quantitatively to a heavy clear liquid polymer with a musty odor, this polymer forming a separate layer on top of the copper solution.

The ammoniacal cuprous acetate solutions of appropriate composition are capable of extracting diolefins for example butadiene, though other diolefins such as isoprene, piperylene and dimethyl butadiene may be similarly extracted from hydrocarbon mixtures such as those obtained by thermal cracking of oil, and by catalytic dehydrogenation of butenes and butanes, yielding as a product butadiene of extremely high purity. It has been found that unsaturated hydrocarbons other than butadiene are also absorbed by the solution when contacted therewith. Among such hydrocarbons are the butenes, the acetylenes and the allenes. The acetylenes of most interest in processes for concentrating butadiene are methyl acetylene, ethyl acetylene and vinyl acetylene. The copper solutions described have quite high dissolving power for the acetylenes. For instance, in the case of a hydrocarbon gas containing 0.1% of any of the acetylenes designated, a copper solution brought to equilibrium therewith at 100° F. contains about 0.19 mols of dissolved acetylenes per liter of solution or about 0.8% by weight. Higher concentrations of acetylenes in the gas phase result in higher concentrations of acetylene dissolved in the solution. It is not feasible or desirable to increase the dissolved acetylenes content of these solutions to too high a level since under such conditions precipitation of solid copper acetylides is encountered. The presence of these solids in an operating system is undesirable since they tend to stop the flow of liquid and since they constitute a hazard due to their tendency to decompose with some violence under proper activation. One means for preventing these difficulties is a regulation of the copper solution composition and, more specifically, the use of ammonia in excess of that required to solubilize the cuprous oxide dissolved in the solution.

Although cuprous acetate solutions of appropriate composition are capable of dissolving appreciable amounts of such acetylenes without precipitating copper acetylides, it is necessary to remove these acetylenes from the solution in any process in which the solution is continually recycled through the butadiene extraction system. Part of these dissolved acetylenes can be removed along with the butadiene product in the step in which the dissolved butadiene is boiled out of the solution. Acetylenes such as vinyl and ethyl however are undesirable in the product butadiene and hence only limited amounts can be removed from the solution in this manner. Another method for removing the dissolved acetylenes is to boil them out of the copper solution together with ammonia in a step subsequent to the one in which butadiene is boiled out of the solution. Still another method for effecting acetylenes removal consists of heating the solution for an appropriate period of time at temperatures in the range of 160°–200° F. subsequent to the removal of butadiene in the desorption step of a cyclic process. In such a heating step acetylenes such as ethyl acetylene, vinyl acetylene, methyl acetylene (hereafter designated as monomeric acetylenes) are polymerized to higher boiling materials. It has been found that the initial step in such a polymerization reaction consists of formation of dimers in the case of pure acetylenes and of codimers in the case of mixed acetylenes. If butadiene and allenes are present copolymers of the acetylenes and these hydrocarbons are also formed. Some polymerization of the butadiene and allenes likewise results. These resulting dimeric materials are considerably less soluble in the copper solution than are the monomeric acetylene from which they are derived. Under prolonged heating conditions, however, the dimers and codimers formed in this manner continue to polymerize giving rise to materials of higher molecular weight which in many instances may be insoluble in all common solvents. The nature of these higher molecular weight polymers depends to a considerable extent upon the following factors:

1. The nature of the monomeric acetylenes from which they are derived.
2. The physical conditions under which the dimers are polymerized.

The most important of these conditions are the temperature and medium in which polymerization occurs. In regard to the latter it has been found that if the dimers are dissolved in a solvent such as a hydrocarbon in which they are miscible and allowed to polymerize in such a medium the nature of the resulting high molecular weight materials is different from the nature of the materials obtained when no added hydrocarbon solvent is present. For instance, if the dimers are dissolved in a highly aromatic fraction such as xylenes or solvent naphtha and the resulting solution heated the resulting materials, even when extremely polymerized, are still soluble in this solvent. If the polymers are not formed in the presence of these solvents, they are completely insoluble in these solvents when once formed.

A further object of this invention is to provide a means for continuously separating both acetylenes and other polymers from the absorbent copper solutions in a cyclic process for concentrating butadiene and other olefins. This object is accomplished by removing these polymers from the solution by contacting the latter with a liquid which is not appreciably miscible with the copper solution and which is capable of dissolving considerable amounts of both the acetylene polymers and other polymers from the latter. Such solvents include hydrocarbon fractions of a wide range of boiling points, more specifically, those boiling from the $C_4$ range through the gas oil range. They may consist of paraffins, naphthenes, olefins and aromatics or mixtures of these, although fractions relatively high in olefins and/or aromatics are preferred. The solvent may be composed of butenes, as specifically claimed in application, Serial Number 509,168. Other solvents which are effective for this purpose are higher alcohols, that is, alcohols containing more than 5 carbon atoms, ketones containing more than 5 or 6 carbon atoms and other oxygenated materials which are of limited solubility in the copper solution and which do not react chemically with the solution, such as diethyl ether. The latter are of limited applicability, however, due to their relatively high cost and for this reason we prefer to use hydrocarbon materials.

The solubility of the polymers in hydrocarbon fractions varies with the nature of the fraction and with the molecular weight of the polymer. Polymers of higher molecular weight are less soluble than those of lower molecular weight. Ethyl acetylene and methyl acetylene by themselves and in mixtures with each other do not exhibit tendencies to form polymers of sufficiently high molecular weight that marked insolubility of the resulting polymers in hydrocarbons of a wide range of compositions and boiling points is manifested. In the case of vinyl acetylene, however, and of mixtures of vinyl acetylenes with other acetylenes, polymers of sufficiently high molecular weights are obtained so that they are not completely soluble even in the case of solvents of high dissolving power such as aromatic fractions. However, even in the case of these polymers which are not completely soluble in hydrocarbons it has been discovered that these polymers are effectively separated from the solution, in which they are in suspension, by washing the solution with a hydrocarbon. While this action undoubtedly is in part one of solution of the polymer there is also involved a wetting of the undissolved polymer by the oil to such a degree that it is preferentially retained by the hydrocarbon rather than by the copper solution. In such cases, it is observed that the portion of the polymers insoluble in the hydrocarbon tends to form a sludge in the hydrocarbons and under conditions of prolonged standing will settle out to form a slurry, in the lower part of the hydrocarbon, of high polymer content.

The invention is more clearly illustrated by the following description with reference to the drawings, Fig. 1, Fig. 2, Fig. 3, and Fig. 4 showing various diagrammatic flow plans.

In view of the above considerations there are several possible methods of actually carrying out this process in practice. Fig. 1 consists of contacting the solutions in appropriate equipment such as turbo mixer 1, packed tower, or in a mixing centrifugal pump, with the hydrocarbon immediately after the step in which the butadiene-free solution is heated in soaker 2 under conditions appropriate for converting the monomeric acetylenes to polymer. The cuprous salt solution is desorbed of butadiene in desorber 3, the butadiene being removed through pipe 4. The butadiene-free solution passes through pipe 5 to soaker 2 where it is heated to polymerize the acetylenes and passed through pipe 6 and cooler to pipe 8. Oil is passed through pipe 8 and the two, oil and essentially butadiene-free solution, passed to mixer 1. The mixed solution and hydrocarbon are passed through pipe 9 to separator 10 from which the cuprous solution is withdrawn through pipe 11 and oil with polymer in solution through pipe 12. Under these conditions the polymers are largely removed as the dimers and codimers since in actual practice it has been found that the dimers formed in the solution-soaking stage have not had sufficient time at high temperatures to polymerize much beyond the dimer stage. Under such conditions the polymers are leargely soluble in hydrocarbon solvent. The scrubbing operation may be conducted at temperatures from atmospheric to 200° F. Preferably, however, the temperatures should be kept as low as possible in order to retard further polymerization of the polymers dissolved in the oil and minimize the amount of sludge polymers obtained in the oil phase.

Figure 2:
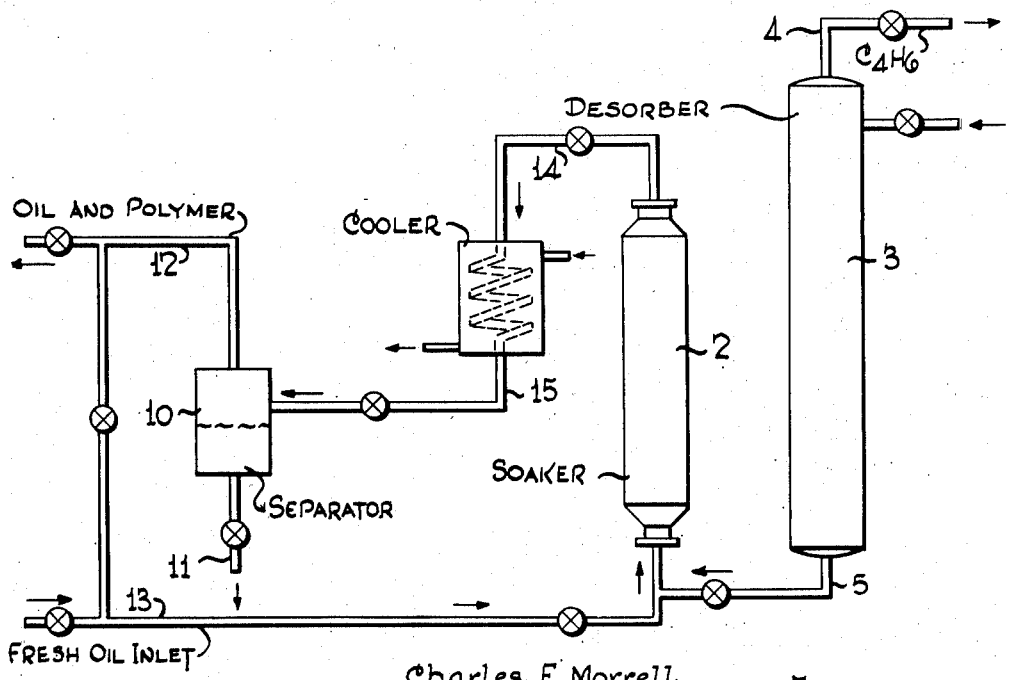

Referring to Fig. 2, another method for carrying out this process consists of injecting the hydrocarbon through pipe 13 into the butadiene-free solution as it passes through pipe 5 and circulating this oil therefrom through the soaker 2 in which the solution is heated to convert the monomeric acetylenes to polymers. The mixture of oil and polymer is then passed through pipe 14, cooler 15 to separator 10. The oil is then separated under gravity from the copper solution and may be returned to the solution soaking stage 2, with some discard to prevent undue accumulation of polymers in the oil, through pipes 12 and 13 together with some fresh oil.

The resulting solution (and/or suspension) of polymers in the hydrocarbon solvent may be treated in a number of ways after separation from the copper solution. In one method of operation the hydrocarbon containing polymer is simply discarded or burned after the polymers have accumulated in the added hydrocarbon to the extent of 5–50%. In other cases it may be desirable to remove part of the hydrocarbon solvent by distillation overhead from the polymers. This operation may be carried out in the presence of a flux oil of higher boiling point than the original solvent. For instance, in case benzene is used to scrub the solution, the solution of polymers in benzene may be fed to a fractionating column into the bottom of which a heavy oil such as a gas oil is continuously fed. The benzene is taken overhead leaving the polymers in the oil which can subsequently be fed to a burning ground or to a furnace. In certain cases it is desirable to add to the solvent an anti-oxidant inhibitor such as phenols, polyhydric aromatics, aromatic amines and amino phenols. The purpose of these compounds is to retard polymerization to insoluble polymers and to prevent accumulation of peroxides in the polymers as a result of contact with air.

EXAMPLE 5

Figure 3:
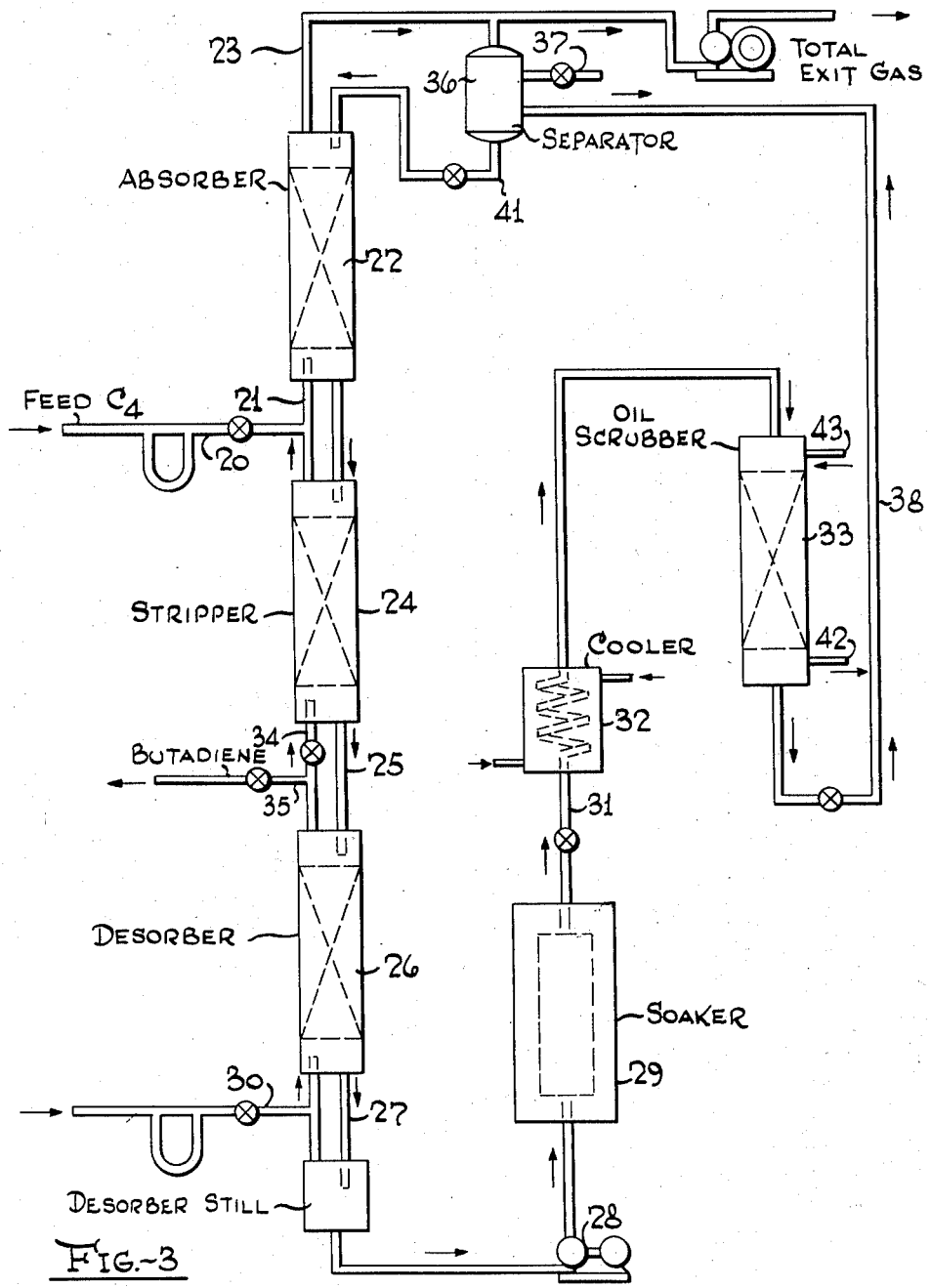

In equipment shown in Fig. 3 a 72-hour run was conducted in which a copper solution was contacted with a $C_4$ cut containing 75% butadiene and 2½% acetylenes, these acetylenes being an equimolar mixture of vinyl and ethyl acetylene. The ratio of solution and hydrocarbon feed rates were such that the solution picked up 0.02 mole/liter (1.0 gram/liter) of acetylene per cycle through the system. After boiling off the butadiene in the desorption zone the solution was heated in the soaker for about 40 minutes thereby polymerizing 0.0199 mol of acetylene per liter of solution per pass. The solution leaving the soaker was scrubbed with xylene in a packed tower and the solution continually returned to the absorption system. This operation was continued for 72 hours and the solution tested at various times for its polymer content after leaving the zone in which it was scrubbed with xylene.

The $C_4$ cut was passed through pipe 20 to pipe 21 and absorber 22, the butadiene- and acetylene-free gas being removed from absorber 22 by pipe 23. A cuprous solution introduced into absorber 22 through pipe 41 passed in countercurrent flow to the $C_4$ cut. The cuprous solution containing dissolved butadiene and acetylenes passed from absorber 22 by pipe 40 to stripper 24 where it was heated to 80° F. by heating means not shown. The heated cuprous solution was passed through pipe 25 to desorber 26 where it was heated further to 145° F. The cuprous solution was then passed through pipe 27 by means of pump 28 to soaker 29 maintained at 180° F. Make-up ammonia was added through pipe 30 to desorber 26. The cuprous solution was then passed through pipe 31 and cooler 32 to scrubber 33 where it was scrubbed with xylene. Tower 33 was simply a packed tower filled with xylene introduced through pipe 42 through which the solution flowed. The cuprous solution with some entrained xylene passed through pipe 38 through separator 36 to the top of absorber 22. Separator 36 allowed the xylene to separate from the cuprous solution, the xylene containing polymer being discarded through line 37. The purified butadiene boiled out of the solution in desorber 26 was passed completely or in part to stripper 24 via line 34 or recovered in part as product from line 35. The xylene in scrubber 33 when the polymer in solution has increased to 50% was removed through pipe 43, the polymer separated and the xylene returned through pipe 42. The following figures show that all times during the operation the copper solution remained substantially free of polymeric material.

*Ether extraction of copper solution*

| Hour | Extract, gms./l. | Hour | Extract, gms./l. | Hour | Extract, gms./l. |
|---|---|---|---|---|---|
| 4 | 0.04 | 37 | 0.12 | 61 | 0.32 |
| 13 | 0.12 | 44 | 0.36 | 69 | 0.40 |
| 28 | 0.32 | 52 | 0.36 | | |

Throughout the entire run no solid polymers accumulated in the desorption, adsorption, and soaking solutions of the system. Some sludging of polymers in the wash xylene was observed. This sludging was of such a nature that the polymers were concentrated in the lower portion of the solvent and this portion could be withdrawn and discarded continuously.

Referring to the Fig. 4 where the flow of materials is shown diagrammatically, numeral 51 denotes a pipe through which a hydrocarbon $C_4$ mixture containing acetylenes and butadiene is passed to pipe 52 and into a turbine-type mixer 53 together with ammoniacal cuprous acetate solution which is introduced through pipe 54 into pipe 52. After being thoroughly mixed the mixture is passed through pipe 55 into separator 56 where the unabsorbed hydrocarbons are removed through pipe 57 and recycled to turbine-type mixer 58 together with an ammoniacal cuprous acetate solution which is introduced into pipe 57 through pipe 59, being obtained from settler 60. The mixture of ammoniacal cuprous acetate solution and hydrocarbon gases is passed through pipe 61 into settler 62 where the cuprous acetate ammoniacal solution is removed through pipe 54, and the unabsorbed and unreacted hydrocarbons are removed through pipe 63 and passed through pipe 64 into turbine-type mixer 65 together with a new charge of ammoniacal cuprous acetate solution substantially free of any olefins or diolefins obtained through pipe 66. The mixture from 65 is then passed through pipe 67 into settler 60 where the unabsorbed hydrocarbons are removed through pipe 68. The rich cuprous acetate ammoniacal solution removed from settler 56 is passed through pipe 69 into separator 70, being heated to a temperature ranging from 10° to 30° C. The absorption temperature used generally ranged from about —10° C. to 25° C. with pressures of about 19 to about 25 lbs. per square inch gauge. The pressure used in this separator 70 is generally about 80 lbs. per square inch gauge. The hydrocarbons that are freed in this separator 70 are removed through pipe 71 and passed through pipe 52 into turbine mixer 53. The ammoniacal cuprous acetate solution with the diolefin in solution is removed by means of pipe 72 and passed to the upper part of desorber 73, where it flows downwardly in countercurrent flow to butadiene and some acetylenes to the bottom part of the tower where a temperature of about 70° C. to 85° C. is maintained at a pressure of about 10 lbs. per square inch gauge. In this tower a major portion of acetylenes are polymerized to harmless polymers. The hot ammoniacal cuprous acetate solution with the last traces of acetylides in solution is passed through pipe 74 to soaking drum 75 where the acetylides are more completely polymerized. The cuprous acetate solution is recycled through pipe 76 to the bottom part of the desorber 73. Side streams are removed from this desorber by means of pipes 77 and 78. Those removed through pipe 77 are passed through heater 79 and returned to the bottom part of the tower through pipe 80 while the ammoniacal cuprous acetate solution removed through pipe 78 is recycled through cooler 81 and passed to the upper part of the tower by means of pipe 82. Therefore a temperature of about 70° C. to 85° C. is maintained in the bottom part of the desorber and in the soaking drum while temperatures of about 25° C. are maintained in the upper part of the desorber 83. From the desorber through pipe 83 is passed substantially pure butadiene to wash tower 84 where it is washed with water supplied by means of pipe 85 to remove any ammonia or other water soluble constituents, the water being removed through pipe 86 and the butadiene being removed through pipe 87. From the soaking drum, the lean (freed of butadiene) ammoniacal cuprous acetate solution is sent through by-pass line 101 to the recycle pipe 66, or through pipe 88 to the second desorber 89 where it is subjected to further heat of about 80° C. to distill over allenes if any are present, the allenes being removed through pipe 90 and passed through to wash tower 91 to be washed with water supplied by pipe 92 and substantially pure allene is obtained through pipe 93, the water being removed by pipe 94. From the second desorber 89 is removed substantially pure ammoniacal cuprous acetate solution which may be supplied with further cuprous acetate and ammonia by means of pipe 95 and is then cooled and recycled for use in the absorption of butadiene, acetylenes and allenes.

In the operation just outlined with reference to Fig. 4, it can be seen that the cuprous salt solution is passed countercurrently to the hydrocarbon stream from which the cuprous salt solution absorbs the diolefin and the acetylenes in the absorption stages (from mixer 65 to mixer 53) so that the remaining unabsorbed hydrocarbons, such as essentially butenes from a $C_4$ cut are in an upper liquid phase withdrawn continuously through line 68 from settler 60 while the rich cuprous salt solution of absorbed diolefin and acetylenes, e. g., butadiene, ethyl acetylene, and vinyl acetylene from a $C_4$ cut, is passed from separator 70 to the desorber 73.

Since the acetylenes, either as such or in the form of acetylides, are polymerized in the cuprous salt solution flowing down into the lower regions of desorber tower 73 and further in the soaking drum 75, and since these resulting polymers are mainly in the nature of the filterable solid polymers and liquid oily polymers which separate from the cuprous salt solutions, these polymers can be easily removed from the cuprous salt solutions.

Conventional filters, such as filter presses, sand filters, or the like, represented by numeral 96, can be connected through lines 97 and 98 into a line conveying the lean extracting solution, e. g. line 66, for filtering out the solid polymers, either continuously from all or a portion of the solution, or as stand-by equipment employed intermittently when and if solid polymers accumulate beyond a certain limit, depending upon the amount and kinds of acetylenes present in the initial hydrocarbon feed and the extent to which the acetylenes and their polymers are otherwise removed in the system.

A certain amount of the solid polymers tend to deposit in the soaking drum or any surge tanks used in the extracting solution recycle lines. Some of the liquid polymers from the alkyl acetylenes form a separate upper layer phase on the cuprous salt solution as explained in Example 4, hence this upper phase can be decanted at intervals, as by means of line 99. An organic solvent like a liquid hydrocarbon material supplied, e. g. to the soaking drum 25 through line 100, preferentially takes up both solid and liquid polymers by solution and in suspension, as described with reference to Fig. 2, so that the resulting polymers are kept more soluble and the organic slurry of polymers can be removed better by decantation from the cuprous salt solution through line 99 or from a subsequent settler.

In the operation of the absorption stage where the liquid raffinate, such as liquid butene contacts the recycled stream of lean cuprous salt solution, as in mixer 65 and settler 60, the liquid raffinate, such as mainly composed of the unabsorbed butenes, makes a practically complete removal of any of the liquid polymers of acetylenes, so that the cuprous salt solution is thus satisfactorily freed of such polymers before it is further passed countercurrent to the stream of hydrocarbons from which diolefins and acetylenes are absorbed by the solution. This same removal of liquid polymers by the raffinate is accomplished when the countercurrent absorption is carried out in a tower from which the raffinate is removed at the top, above the entrance of recycled extracting solution, while the hydrocarbon feed to be processed enters at a lower part of the tower and the extract is withdrawn still lower at the bottom.

The arrangement shown in Fig. 4 can also be modified as shown in Fig. 1 and Fig. 3 with respect to the use of mixing and scrubbing means following a soaking drum for washing out or dissolving the liquid polymers with an organic solvent and removing the resulting polymer solution or slurry from the lean aqueous extracting solution.

It is not intended that this invention should be limited as regards the type of copper solution to which it is applied. Solutions of a wide range of composition may be used so long as they are effective for concentrating diolefins. The solutions may be either acid or basic in nature and may contain as a solubilizing agent such compounds as ammonia, methyl amine, dimethyl amine, pyridine, and other amino compounds.

The preferred kinds of cuprous salt solutions referred to in the examples as copper ammonium acetate solutions or ammoniacal cuprous acetate solutions are of the type described and claimed in U. S. Patents 2,384,329 and 2,429,134.

We claim:

1. An improved copper ammonium acetate absorption and purification method for separating butadiene from a hydrocarbon mixture containing butadiene together with butenes and small amounts of acetylenes, comprising the steps of contacting said mixture with a solution of copper ammonium acetate to obtain a rich solution containing butadiene and acetylenes, subsequently heating said rich solution to desorb butadiene whereby a lean solution substantially free of butadiene is obtained, exposing said lean solution to conditions causing polymerization of acetylenes, and washing said exposed solution with an oxygenated organic solvent for liquid oily polymers formed by the polymerization of said acetylenes.

2. The improvement in a process of using a solvent to separate a diolefin from a mixture of saturated and unsaturated hydrocarbons containing a diolefin and acetylenes which comprises contacting a mixture of saturated and unsaturated hydrocarbons containing a diolefin and acetylenes with a cuprous salt solution which selectively dissolves diolefins and acetylenes, separating the resulting cuprous salt solution with the dissolved diolefin and acetylenes from undissolved hydrocarbons, heating the cuprous salt solution with the diolefin and acetylenes in solution to desorb the diolefin, then further heating the cuprous salt solution to polymerize the acetylenes remaining in solution and extracting the polymers from the cuprous salt solution by means of a oxygenated organic solvent for the polymers which solvent is immiscible with the cuprous salt solution.

CHARLES E. MORRELL.
MILLER W. SWANEY.

REFERENCES CITED

The following references are of record in the file of this patent:

UNITED STATES PATENTS

| Number | Name | Date |
|---|---|---|
| 2,383,784 | Fleer | Aug. 28, 1945 |
| 2,399,882 | Morrell et al. | May 7, 1946 |
| 2,463,846 | Bain et al. | Mar. 8, 1949 |